United States Patent
Lee et al.

(10) Patent No.: US 10,963,102 B2
(45) Date of Patent: Mar. 30, 2021

(54) SYSTEMS AND METHODS FOR TOUCH-SENSING AND LED-CONTROL FOR USE IN CAPACITIVE TOUCH SCREENS

(71) Applicant: SYNCMOS TECHNOLOGIES INTERNATIONAL, INC., Hsinchu (TW)

(72) Inventors: Ching Hung Lee, Hsinchu (TW); Chia Chien Tung, Taichung (TW)

(73) Assignee: SYNCMOS TECHNOLOGIES INTERNATIONAL, INC., Hsinchu (TW)

(*) Notice: Subject to any disclaimer, the term of this patent is extended or adjusted under 35 U.S.C. 154(b) by 0 days.

(21) Appl. No.: 16/459,185

(22) Filed: Jul. 1, 2019

(65) Prior Publication Data
US 2020/0089348 A1 Mar. 19, 2020

(30) Foreign Application Priority Data
May 9, 2018 (CN) .......................... 201810439179.9

(51) Int. Cl.
G06F 3/042 (2006.01)
G06F 3/041 (2006.01)
G06F 3/044 (2006.01)

(52) U.S. Cl.
CPC .............. G06F 3/042 (2013.01); G06F 3/044 (2013.01); G06F 3/0412 (2013.01)

(58) Field of Classification Search
CPC ........ G06F 3/042; G06F 3/044; G06F 3/0412; G06F 3/04184; H05B 45/00
See application file for complete search history.

(56) References Cited

U.S. PATENT DOCUMENTS

2010/0177058 A1* 7/2010 Lin ..................... H03K 17/9622
345/174
2011/0074609 A1* 3/2011 Lin ....................... H03K 17/962
341/33
(Continued)

FOREIGN PATENT DOCUMENTS

CN 102317893 A 1/2012
CN 102324210 A 1/2012
(Continued)

OTHER PUBLICATIONS

China Intellectual Property Office, Office Action dated Sep. 16, 2019, in China Patent Application No. 201810439179.9.
(Continued)

*Primary Examiner* — Muhammad N Edun
(74) *Attorney, Agent, or Firm* — Faegre Drinker Biddle & Re (57) ABSTRACT

System and method for touch sensing and LED control for a touch screen. For example, the system comprises: a control chip including m first multiplexing terminals and n second multiplexing terminals, wherein m and n are integers greater than 2; k LEDs, wherein a rth LED of the k LEDs is connected to an ith first multiplexing terminal of the m first multiplexing terminals and to a jth second multiplexing terminal of the n second multiplexing terminals; wherein: the rth LED is in between the ith first multiplexing terminal and the jth second multiplexing terminal; r is an integer greater than 0 and less than or equal to k; i is an integer greater than 0 and less than or equal to m; j is an integer greater than 0 and less than or equal to n; and (m+n) touch-sensing capacitors.

20 Claims, 6 Drawing Sheets

(56) References Cited

U.S. PATENT DOCUMENTS

2013/0147756 A1* 6/2013 Chan .................. H03K 17/9622
                                                        345/174
2018/0107309 A1* 4/2018 Endo ..................... G06F 3/0416

FOREIGN PATENT DOCUMENTS

| CN | 102576278 A | 7/2012 |
|---|---|---|
| CN | 104077990 A | 10/2014 |
| CN | 104298408 A | 1/2015 |
| CN | 106656143 A | 5/2017 |
| CN | 207337375 U | 5/2018 |
| TW | I-545493 B | 8/2016 |
| WO | WO 2013/082799 A1 | 6/2013 |

OTHER PUBLICATIONS

Taiwan Intellectual Property Office, Office Action dated Mar. 8, 2019, in Taiwan Patent Application No. 107122840.

* cited by examiner

SYSTEMS AND METHODS FOR TOUCH-SENSING AND LED-CONTROL FOR USE IN CAPACITIVE TOUCH SCREENS

1. CROSS-REFERENCES TO RELATED APPLICATIONS

This application claims priority to Chinese Patent Application No. 201810439179.9, filed May 9, 2018, incorporated by reference herein for all purposes.

2. BACKGROUND OF THE INVENTION

Certain embodiments of the present invention are directed to the field of circuits. More particularly, some embodiments of the invention provide circuits for touch-sensing and LED-control. Merely by way of example, some embodiments of the invention have been applied to capacitive touch screens. But it would be recognized that the invention has a much broader range of applicability.

Capacitive touch screens are widely used in applications such as smartphones, tablets, and personal assistances. In most electronic devices, different software modules and/or different hardware circuits are utilized to implement touch-sensing function and Light Emitting Diode (LED)-control function, respectively.

However, utilizing different software modules to implement touch-sensing and LED-control functions respectively have drawbacks including: slow speed, complicated programming, uneven LED brightness, and high consumption of processor resources, which lead to reduced processing speed for other processor actions. Utilizing different hardware circuits to implement touch-sensing and LED-control functions respectively have drawbacks including: complicate circuit and excessively large space-take-up.

There is therefore a need for improved methods and systems for circuits for touch-sensing and LED-control for capacitive touch screens.

3. BRIEF SUMMARY OF THE INVENTION

Certain embodiments of the present invention are directed to the field of circuits. More particularly, some embodiments of the invention provide circuits for touch-sensing and LED-control. Merely by way of example, some embodiments of the invention have been applied to capacitive touch screens. But it would be recognized that the invention has a much broader range of applicability.

In various embodiments, a system (e.g., a circuit) for touch sensing and LED control for a touch screen includes: a control chip including m first multiplexing terminals and n second multiplexing terminals, wherein m and n are integers greater than 2; k LEDs, wherein a rth LED of the k LEDs is connected to an ith first multiplexing terminal of the m first multiplexing terminals and to a jth second multiplexing terminal of the n second multiplexing terminals; wherein: the rth LED is in between the ith first multiplexing terminal and the jth second multiplexing terminal; r is an integer greater than 0 and less than or equal to k; i is an integer greater than 0 and less than or equal to m; j is an integer greater than 0 and less than or equal to n; and (m+n) touch-sensing capacitors, wherein each touch-sensing capacitor of the (m+n) touch-sensing capacitors is connected to a reference ground and to one multiplexing terminal selected from the m first multiplexing terminals and the n second multiplexing terminals.

In various embodiments, a control chip for touch sensing and LED control for a touch screen includes: m first multiplexing terminals, m being an integer greater than 2; and n second multiplexing terminals, n being an integer greater than 2; wherein: an ith first multiplexing terminal of the m first multiplexing terminals and a jth second multiplexing terminal of the n second multiplexing terminals are configured to connect with a rth LED of k LEDs, r is an integer greater than 0 and less than or equal to k, i is an integer greater than 0 and less than or equal to m, j is an integer greater than 0 and less than or equal to n; and one multiplexing terminal selected from the m first multiplexing terminals and the n second multiplexing terminals is configured to connect with each teach-sensing capacitor of (m+n) touch-sensing capacitors.

In various embodiments, the method for switching states between touch-sensing and LED-control for a touch-screen using a control chip includes: initializing a touch-sensing function and an LED-control function; enabling a touch-sensing channel and an LED-control channel; determining whether the LED-control function is activated; if the LED-control function is activated, switching to the LED-control channel to implement the LED-control function; determining whether the touch-sensing function is activated; and if the touch-sensing function is activated, switching to the touch-sensing channel to implement the touch-sensing function.

In certain embodiments, the system (e.g., circuit) for touch-sensing and LED-control for a capacitive touch screen implements a touch-sensing function and a LED-control function based on at least controlling the same one or more terminals of a control chip, which in some examples, enables driving of a large number of LEDs.

5. DETAILED DESCRIPTION OF THE INVENTION

Certain embodiments of the present invention are directed to the field of circuits. More particularly, some embodiments of the invention provide circuits for touch-sensing and LED-control. Merely by way of example, some embodiments of the invention have been applied to capacitive touch screens. But it would be recognized that the invention has a much broader range of applicability.

In certain embodiments, the circuit for touch-sensing and LED-control for a capacitive touch screen implements a touch-sensing function and a LED-control function based on at least controlling the same one or more terminals of a control chip based on at least time-division multiplexing, which in some examples, enables driving of a large number of LEDs without increasing the number of terminals on the control chip.

Figure 1:
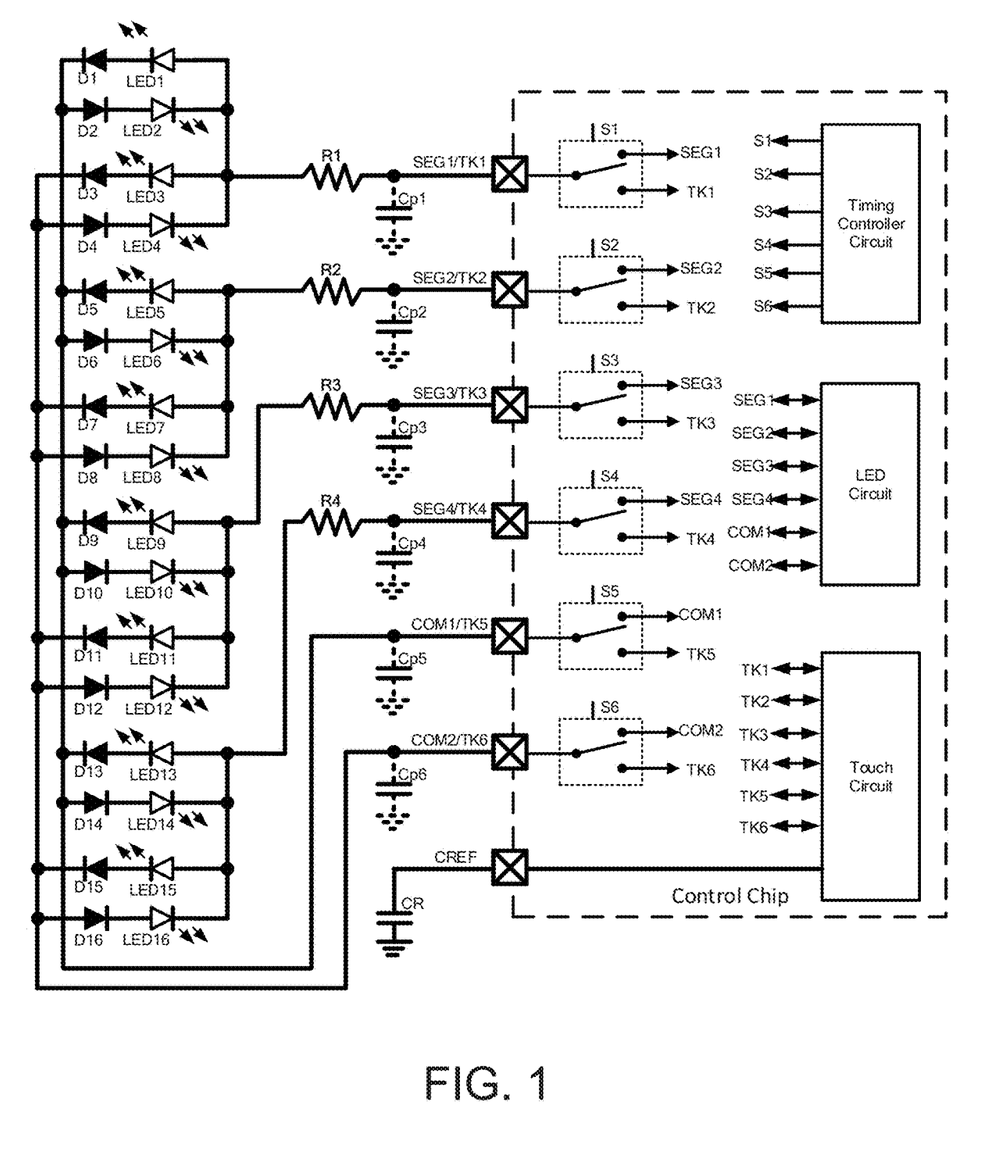
FIG. 1 is a simplified system diagram showing a control circuit for touch-sensing and LED-control, according to some embodiments of the present invention.

FIG. 1 is a simplified system diagram showing a control circuit for touch-sensing and LED-control, according to some embodiments of the present invention. This diagram is merely an example, which should not unduly limit the scope of the claims. One of ordinary skill in the art would recognize many variations, alternatives, and modifications. The control circuit includes a plurality of LEDs, a plurality of diodes, a plurality of connection points (which may be referred to as connection nodes), a plurality of current-limiting resistors, a plurality of touch-sensing capacitors, and a control chip. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

In various embodiments, a control circuit for touch-sensing and LED-control (e.g., for a touch screen, such as a capacitive touch screen) includes sixteen LEDs (including LED1, LED2, . . . , LED15, and LED16), sixteen diodes (including D1, D2, . . . , D15, and D16), two common-node LED connection points (including COM1 and COM2), four segment-node LED connection points (including SEG1, SEG2, SEG3, and SEG4), four current-limiting resistors (including R1, R2, R3, and R4), six touch-sensing capacitors (Cp1, Cp2, . . . , Cp5, and Cp6) each corresponding to one of six touch keys (including TK1, TK2, . . . , TK5, and TK6), and a control chip. In certain examples, the control chip includes a plurality of terminals, such as six terminals including a SEG1/TK1 terminal, a SEG2/TK2 terminal, a SEG3/TK3 terminal, a SEG4/TK4 terminal, a COM1/TK5 terminal, and a COM2/TK6 terminal.

In some embodiments, the sixteen LEDs (including LED1-LED16) are connected in parallel with each other. In certain embodiments, the sixteen diodes (including D1-D16) are connected in series with the sixteen LEDs respectively. In various embodiments, one of the sixteen LEDs is connected in series with one diode of the sixteen diodes. In some examples, each serially connected diode and LED pair is parallelly connected with at least another connected diode and LED pair. As an example, D1 and LED1 are serially connected as a first diode-LED pair, D2 and LED2 are serially connected as a second diode-LED pair, and the first diode-LED pair and the second diode-LED pair are parallelly connected. In various embodiments, a first common-node LED connection point COM1 of some, such as half, of LED1-LED16 (e.g., LED1-2, LED5-6, LED9-10, LED13-14) are connected to the COM1/TK5 terminal of the control chip. In certain embodiments, a second common-node LED connection point COM2 of some, such as half, of LED1-LED16 (e.g., LED3-4, LED7-8, LED11-12, LED15-16) are connected to the COM2/TK6 terminal of the control chip. In certain embodiments, a first segment-node LED connection point SEG1 of a first LED group (e.g., including LED1-LED4) of LED1-LED16 is connected to the SEG1/TK1 terminal of the control chip via the current-limiting resistor R1. In certain embodiments, a second segment-node LED connection point SEG2 of a second LED group (e.g., including LED5-LED8) of LED1-LED16 is connected to the SEG2/TK2 terminal of the control chip via the current-limiting resistor R2. In certain embodiments, a third segment-node LED connection point SEG3 of a third LED group (e.g., including LED9-LED12) of LED1-LED16 is connected to the SEG3/TK3 terminal of the control chip via the current-limiting resistor R3. In certain embodiments, a fourth segment-node LED connection point SEG4 of a fourth LED group (e.g., including LED13-LED16) of LED1-LED16 is connected to the SEG4/TK4 terminal of the control chip via the current-limiting resistor R4. In some embodiments, the touch-sensing capacitors Cp1-Cp6 are respectively connected to the SEG1/TK1, SEG2/TK2, SEG3/TK3, SEG4/TK4, COM1/TK5, and COM2/TK6 terminals, each between the respective terminals and a reference ground.

In various embodiments, each of the SEG1/TK1, SEG2/TK2, SEG3/TK3, SEG4/TK4, COM1/TK5, and COM2/TK6 terminals of the control chip uses time-division multiplexing to implement the LED control function and the touch-sensing function, which in some examples, enables driving of larger number of LEDs without the need to increase the number of terminals of the control chip.

In some embodiments, when the control circuit (e.g., the system of FIG. 1) is in a LED-control mode, the COM/TK terminals (including the COM1/TK5 terminal and the COM2/TK6 terminal) of the control chip are forward-biasedly or reverse-biasedly connected the plurality of LEDs (e.g., the sixteen LEDs) which are connected to the SEG/TK terminals (including the SEG1/TK1, SEG2/TK2, SEG3/TK3, and SEG4/TK4 terminals) via the diodes corresponding to their respective LEDs to their respective LED loops. In certain embodiments, the control circuit is configured to control the on/off of the LEDs (e.g., LED1-LED16) by controlling the voltage at least one SEG/TK terminal of the SEG/TK terminals and at least one COM/TK terminal of the COM/TK terminals.

In certain examples, the control chip includes a LED-control circuit (which may be referred to as the LED circuit) and a touch-sensing circuit (which may be referred to as the touch circuit). In some embodiments, when the control circuit is in a touch-sensing mode (e.g., switched from the LED-control mode), the LED loops are disconnected, such as by setting the SEG/TK terminals of the control chips to floating. In certain examples, the diodes are configured to reduce the LED capacitance effects of the LED loops which may influence sensitivity of the touch-sensing circuit of the control chip.

In various embodiments, when the control circuit is in the touch-sensing mode, the one or more touch-sensing capacitors of the control circuit are configured to respond to activation of one or more corresponding touch keys, such as via touching on a capacitive touch screen. For example, when touched, the capacitive of the touch-sensing capacitors will increase, corresponding to the increased amount of charge stored by the capacitor. As such, the touch-sensing circuit of the control chip is configured to determine whether one or more of the connected touch keys are touched by monitoring the capacitance of its one or more capacitors.

In some embodiments, a timing-controller circuit of the control chip is configured to control whether the control circuit is in the LED-control mode or in the touch-sensing mode by generating switching signals S1, S2, S3, S4, S5, and/or S6 for controlling the LED circuit and/or the touch circuit of the control chip. In some examples, when the control circuit is in the LED-control mode, the timing controller circuit is configured to generate switching signals (which may be referred to on/off signals) S1-S6 to switch the modes or states of the SEG/TK terminals and the COM/TK terminals of the control chip to be in connection to the LED control circuit of the control chip. In some examples, when the control circuit is in the touch-sensing mode, the timing controller circuit is configured to generate switching signals (which may be referred to on/off signals) S1-S6 to switch the modes or states of the SEG/TK terminals and the COM/TK terminals of the control chip to be in connection to the touch-sensing circuit of the control chip.

In certain embodiments, the sixteen LEDs of the control circuit is divided into four LED groups, including a first LED group, a second LED group, a third LED group, and a fourth LED group.

In various examples, the first LED group includes LED1-LED4, the SEG1/TK1 terminal of the control chip is forward-biasedly connected to the anodes of LED1 and LED3 via the current-limiting resistor R1, and the cathodes of LED1 and LED3 are connected to the COM1/TK5 terminal and COM2/TK6 of the control chip via diodes D1 and D3, respectively. In certain examples, the COM1/TK5 terminal of the control chip is forward-biasedly connected to the anode of LED2, the cathode of the LED2 is connected to the SEG1/TK1 terminal of the control chip via the current-limiting resistor R1. In certain examples, the COM2/TK6 terminal of the control chip is forward-biasedly connected to the anode of LED4, the cathode of the LED4 is connected to the SEG1/TK1 terminal of the control chip via the current-limiting resistor R1.

In various examples, the second LED group includes LED5-LED8, the SEG2/TK2 terminal of the control chip is forward-biasedly connected to the cathodes of LED5 and LED7 via the current-limiting resistor R2, and the anodes of LED5 and LED7 are connected to the COM1/TK5 terminal and COM2/TK6 of the control chip via diodes D5 and D7, respectively. In certain examples, the COM1/TK5 terminal of the control chip is forward-biasedly connected to the anode of LED6, the cathode of the LED6 is connected to the SEG2/TK2 terminal of the control chip via the current-limiting resistor R2. In certain examples, the COM2/TK6 terminal of the control chip is forward-biasedly connected to the anode of LED8, the cathode of the LED8 is connected to the SEG2/TK2 terminal of the control chip via the current-limiting resistor R2.

In various examples, the third LED group includes LED9-LED12, the SEG3/TK3 terminal of the control chip is forward-biasedly connected to the anodes of LED9 and LED11 via the current-limiting resistor R3, and the cathodes of LED9 and LED11 are connected to the COM1/TK5 terminal and COM2/TK6 of the control chip via diodes D9 and D11, respectively. In certain examples, the COM1/TK5 terminal of the control chip is forward-biasedly connected to the anode of LED10, the cathode of the LED10 is connected to the SEG3/TK3 terminal of the control chip via the current-limiting resistor R3. In certain examples, the COM2/TK6 terminal of the control chip is forward-biasedly connected to the anode of LED12, the cathode of the LED12 is connected to the SEG3/TK3 terminal of the control chip via the current-limiting resistor R3.

In various examples, the third LED group includes LED13-LED16, the SEG4/TK4 terminal of the control chip is forward-biasedly connected to the anodes of LED13 and LED15 via the current-limiting resistor R4, and the cathodes of LED13 and LED15 are connected to the COM1/TK5 terminal and COM2/TK6 of the control chip via diodes D13 and D15, respectively. In certain examples, the COM1/TK5 terminal of the control chip is forward-biasedly connected to the anode of LED14, the cathode of the LED14 is connected to the SEG4/TK4 terminal of the control chip via the current-limiting resistor R4. In certain examples, the COM2/TK6 terminal of the control chip is forward-biasedly connected to the anode of LED16, the cathode of the LED16 is connected to the SEG4/TK4 terminal of the control chip via the current-limiting resistor R4.

In some embodiments, when the control circuit is in the LED-control mode (e.g., switched from the touch-sensing mode), scanning of any of the COM/TK terminals (including the COM1/TK5 terminal and the COM2/TK6 terminal) is performed in two time domains including the common-cathode time domain and the common-anode time domain. In certain examples, when scanning any of the COM/TK terminals of the control chip in the common-cathode time domain, the COM/TK terminals of the control are set to grounded (e.g., to a reference ground), and each of the SEG/TK terminals are set to an operating (or working) voltage VDD, enabling the control circuit to turn on the LEDs (e.g., to illuminate) that are forward-biasedly connected to the SEG/TK terminals. In certain examples, when scanning any of the COM/TK terminals of the control chip in the common-anode time domain, the COM/TK terminals of the control are set to the operating voltage VDD, and each of the SEG/TK terminals are set to grounded (e.g., to a reference ground), enabling the control circuit to turn on the LEDs (e.g., to illuminate) that are forward-biasedly connected to the COM/TK terminals.

In certain embodiments, when scanning any of the COM/TK terminals in the common-cathode time domain or in the common-anode time domain, the remaining COM/TK terminals of the control chip which are not being scanned are set to floating. In some examples, after completing scanning of a COM/TK terminal (e.g., COM1/TK5) of the COM/TK terminals of the control chip in the common-anode time domain and in the common-cathode time domain, scanning of the other COM/TK terminal (e.g., COM2/TK6) of the COM/TK terminals of the control chip in the common-anode time domain and in the common-cathode time domain is next performed. In certain examples, scanning the COM/TK terminals in the described method enables the control circuit to illuminate up to all sixteen LEDs. For example, the number of LEDs that are illuminable equals to 2×the number of COM/TK terminals of the control chip×the number of SEG/TK terminals of the control chip.

Figure 2:
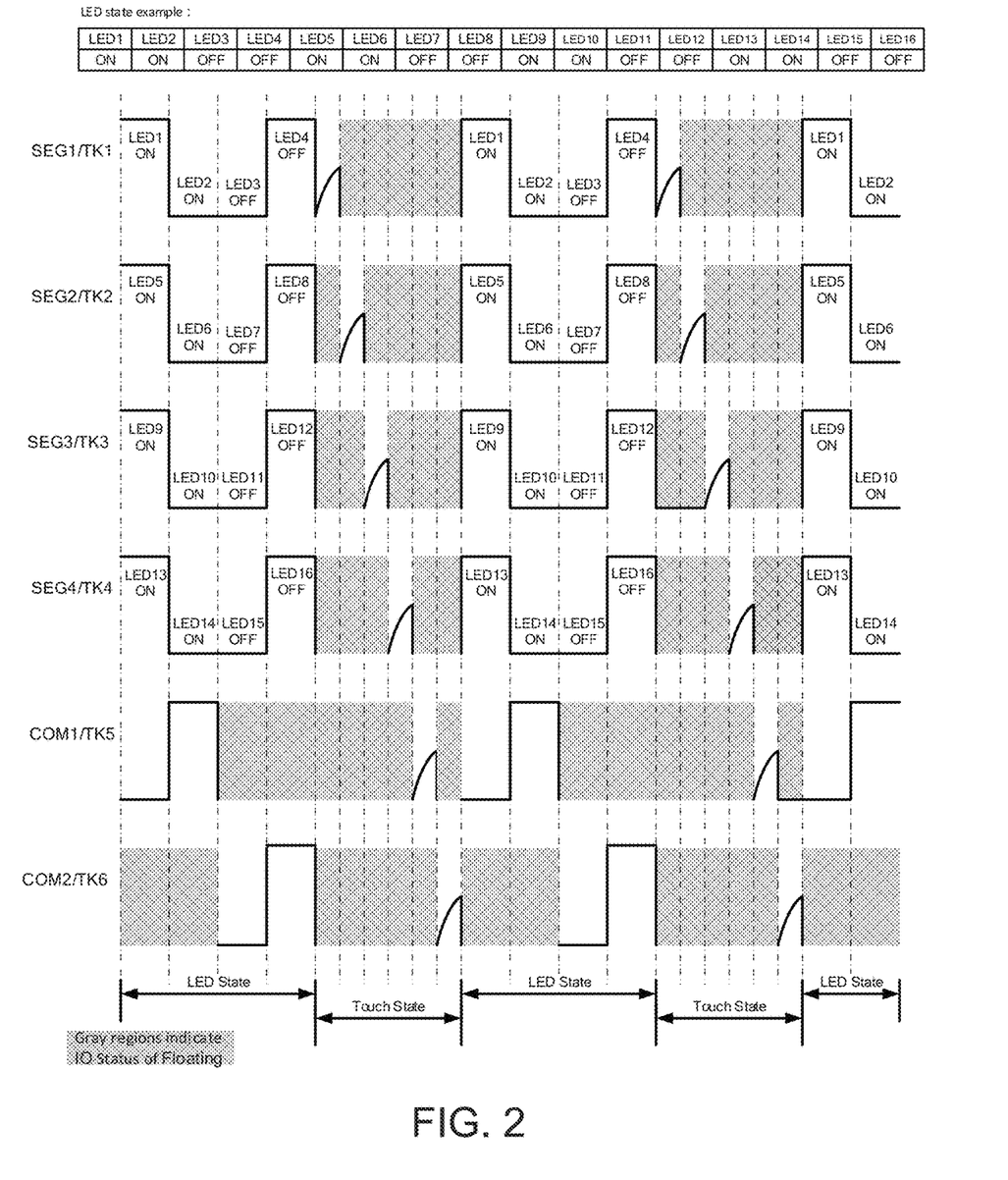
FIG. 2 is a simplified schematic showing a waveform diagram of voltage signals at respective terminals of the control circuit of FIG. 1, according to some embodiments of the present invention.

FIG. 2 is a simplified schematic showing a waveform diagram of voltage signals at respective terminals of the control system (e.g., control circuit) of FIG. 1, according to some embodiments of the present invention. This diagram is merely an example, which should not unduly limit the scope of the claims. One of ordinary skill in the art would recognize many variations, alternatives, and modifications. As an example, the voltage signals shown in the waveform diagram of FIG. 2 are adopted to realize the LED control state as shown in Table 1. As shown, the sixteen LEDs (e.g., of the control system of FIG. 1) are either set to ON (lit) or OFF (not-lit).

TABLE 1

| 1 | 2 | 3 | 4 | 5 | 6 | 7 | 8 | 9 | 10 | 11 | 12 | 13 | 14 | 15 | 16 |
|---|---|---|---|---|---|---|---|---|----|----|----|----|----|----|----|
| ON | ON | OFF | OFF | ON | ON | OFF | OFF | ON | ON | OFF | OFF | ON | ON | OFF | OFF |

In Table 1, the first row indicates the serial number of the LED, which each corresponds to one of the sixteen LEDs of the control system shown in FIG. 1, and the second row indicates the state each LED is in, specifically either in ON (lit) or OFF (not lit).

In some examples, each of the COM/TK terminals are scanned first in the common-cathode time domain followed by scanning in the common-anode time domain. In other examples, each of the COM/TK terminals are scanned first in the common-anode time domain followed by scanning in the common-cathode time domain. In the example shown in FIG. 2, the control system begins from the LED-control mode at power-on followed by switching between the LED-control mode and the touch-sensing mode.

In certain embodiments, a method of switching between LED-control mode and the touch-sensing mode using a control circuit (e.g., the system of FIG. 1), such as to achieve the LED states as shown in Table 1 includes a first LED-control process of scanning the COM1/TK5 terminal of the control chip in the common-cathode time domain and in the common-anode time domain and a second LED-control process of scanning the COM2/TK6 terminal of the control chip in the common-cathode time domain and in the common-anode time domain.

In some examples, in the first LED-control process, when scanning in the common-cathode time domain, the first LED-control process includes setting the COM1/TK5 of the control chip as grounded, setting the COM2/TK6 terminal of the control chip to floating, and setting the SEG1/TK1 to SEG4/TK4 terminals of the control chip to the operating voltage VDD, thereby turning on LED1, LED5, LED9, and LED13 (e.g. to illuminate). In some examples, in the first LED-control process, when scanning in the common-anode time domain, the first LED-control process includes setting the COM1/TK5 of the control chip to the operating voltage VDD, setting the COM2/TK6 terminal of the control chip to floating, and setting the SEG1/TK1 to SEG4/TK4 terminals of the control chip to grounded, thereby turning on LED2, LED6, LED10, and LED14 (e.g. to illuminate).

In some examples, in the second LED-control process, when scanning in the common-cathode time domain, the second LED-control process includes setting the COM2/TK6 of the control chip as grounded, setting the COM1/TK5 terminal of the control chip to floating, and setting the SEG1/TK1 to SEG4/TK4 terminals of the control chip to grounded, thereby not turning on LED3, LED7, LED11, and LED15 (e.g. to remain dimmed). In some examples, in the second LED-control process, when scanning in the common-anode time domain, the second LED-control process includes setting the COM2/TK6 of the control chip to the operating voltage VDD, setting the COM1/TK5 terminal of the control chip to floating, and setting the SEG1/TK1 to SEG4/TK4 terminals of the control chip to the operating voltage VDD, thereby not turning on LED4, LED8, LED12, and LED16 (e.g. to remain dimmed).

In some examples, completing the first LED-control process and the second LED-control process completes one round of scanning of LED1-LED 16. In certain examples, when the LED control states remain unchanged (e.g., as shown in Table 1), the control chip is configured to repeatedly perform the LED-scanning method described above to repeatably and selectively illuminate the LEDs.

In some examples, the control system of FIG. 1 is configured to switch to the touch-sensing mode from the LED-control mode after completing the LED-scanning method described above. In various examples, when in the touch-sensing mode, the SEG1/TK1 terminal, the SEG2/TK2 terminal, the SEG3/TK3 terminal, the SEG4/TK4 terminal, the COM1/TK5 terminal, and the COM2/TK6 terminal are detected (e.g., sequentially sensing touch keys tk1-tk6). According to some examples, the method of implementing the touch-sensing function includes: a first touch-sensing process of scanning touch key tk1 (e.g., after preparing the SEG/TK and COM/TK terminals for scanning), a second touch-sensing process of scanning touch key tk2 after scanning touch key tk1, a third touch-sensing process of scanning touch key tk3 after scanning touch key tk2, a fourth touch-sensing process of scanning touch key tk4 after scanning touch key tk3, a fifth touch-sensing process of scanning touch key tk5 after scanning touch key tk4, and a sixth touch-sensing process of scanning touch key tk6 after scanning touch key tk5.

In some embodiments, the first touch-sensing process includes preparing the settings of the control circuit before sensing the SIG1/TK1 terminal. In various examples, since the SEG1/TK1, SEG2/TK2, SEG3/TK3, SEG4/TK4, COM1/TK5, and COM2/TK6 terminals of the control chip are alternately used for implementing the LED-control function and the touch-sensing function via time-division multiplexing, when using the SEG1/TK1 terminal of the control chip to implement the touch-sensing function of the touch key tk1, the control circuit is configured to set the remaining terminals (e.g., the SEG2/TK2, SEG3/TK3, SEG4/TK4, COM1/TK5, and COM2/TK6 terminals) other than the SEG1/TK1 terminal to floating to help prevent incorrect detection of touch-sensing of the touch key tk1 (e.g., detected by the touch-sensing circuit).

In some embodiments, in the second touch-sensing process, since the SEG1/TK1, SEG2/TK2, SEG3/TK3, SEG4/TK4, COM1/TK5, and COM2/TK6 terminals of the control chip are alternately used for implementing the LED-control function and the touch-sensing function via time-division multiplexing, when using the SEG2/TK2 terminal of the control chip to implement the touch-sensing function of the touch key tk2, the control circuit is configured to set the remaining terminals (e.g., the SEG1/TK1, SEG3/TK3, SEG4/TK4, COM1/TK5, and COM2/TK6 terminals) other than the SEG2/TK2 terminal to floating to help prevent incorrect detection of touch-sensing of the touch key tk2 (e.g., detected by the touch-sensing circuit).

In some embodiments, in the third touch-sensing process, since the SEG1/TK1, SEG2/TK2, SEG3/TK3, SEG4/TK4, COM1/TK5, and COM2/TK6 terminals of the control chip are alternately used for implementing the LED-control function and the touch-sensing function via time-division multiplexing, when using the SEG3/TK3 terminal of the control chip to implement the touch-sensing function of the touch key tk3, the control circuit is configured to set the remaining terminals (e.g., the SEG1/TK1, SEG2/TK2, SEG4/TK4, COM1/TK5, and COM2/TK6 terminals) other than the SEG3/TK3 terminal to floating to help prevent incorrect detection of touch-sensing of the touch key tk3 (e.g., detected by the touch-sensing circuit).

In some embodiments, in the fourth touch-sensing process, since the SEG1/TK1, SEG2/TK2, SEG3/TK3, SEG4/TK4, COM1/TK5, and COM2/TK6 terminals of the control chip are alternately used for implementing the LED-control function and the touch-sensing function via time-division multiplexing, when using the SEG4/TK4 terminal of the control chip to implement the touch-sensing function of the touch key tk4, the control circuit is configured to set the remaining terminals (e.g., the SEG1/TK1, SEG2/TK2, SEG3/TK3, COM1/TK5, and COM2/TK6 terminals) other than the SEG4/TK4 terminal to floating to help prevent incorrect detection of touch-sensing of the touch key tk4 (e.g., detected by the touch-sensing circuit).

In some embodiments, in the fifth touch-sensing process, since the SEG1/TK1, SEG2/TK2, SEG3/TK3, SEG4/TK4, COM1/TK5, and COM2/TK6 terminals of the control chip are alternately used for implementing the LED-control function and the touch-sensing function via time-division multiplexing, when using the COM1/TK5 terminal of the control chip to implement the touch-sensing function of the touch key tk5, the control circuit is configured to set the remaining terminals (e.g., the SEG1/TK1, SEG2/TK2, SEG3/TK3, SEG4/TK4, and COM2/TK6 terminals) other than the COM1/TK5 terminal to floating to help prevent incorrect detection of touch-sensing of the touch key tk5 (e.g., detected by the touch-sensing circuit).

In some embodiments, in the sixth touch-sensing process, since the SEG1/TK1, SEG2/TK2, SEG3/TK3, SEG4/TK4, COM1/TK5, and COM2/TK6 terminals of the control chip are alternately used for implementing the LED-control function and the touch-sensing function via time-division multiplexing, when using the COM2/TK6 terminal of the control chip to implement the touch-sensing function of the touch key tk6, the control circuit is configured to set the remaining terminals (e.g., the SEG1/TK1, SEG2/TK2, SEG3/TK3, SEG4/TK4, and COM1/TK5 terminals) other than the COM2/TK6 terminal to floating to help prevent incorrect detection of touch-sensing of the touch key tk6 (e.g., detected by the touch-sensing circuit).

In some examples, completing the first touch-sensing process, the second touch-sensing process, the third touch-sensing process, the fourth touch-sensing process, the fifth touch-sensing process, and the sixth touch-sensing process completes one round of scanning of the touch keys tk1-tk6. In certain examples, the control circuit (e.g., the system of FIG. 1) is configured to switch to the LED-control mode from the touch-sensing mode after the one round of scanning of the touch keys tk1-tk6.

In various examples, as illustrated in FIG. 2, the control circuit (e.g., system of FIG. 1) is configured to implement the touch-sensing function (e.g., of a capacitive touch screen) has a certain time-distribution ratio (e.g., determined by a predetermined setting and/or by a user input) between the time when the control circuit is in the LED-control mode and the time the control circuit is in the touch-sensing mode. In some examples, the LED brightness and/or the touch sensitivity of the capacitive touch screen is adjustable by adjusting the time-distribution ratio, such as by increasing or decreasing the time during which the control circuit is in the touch-sensing mode relatively to the time during which the control circuit is in the LED-control mode.

Figure 3:
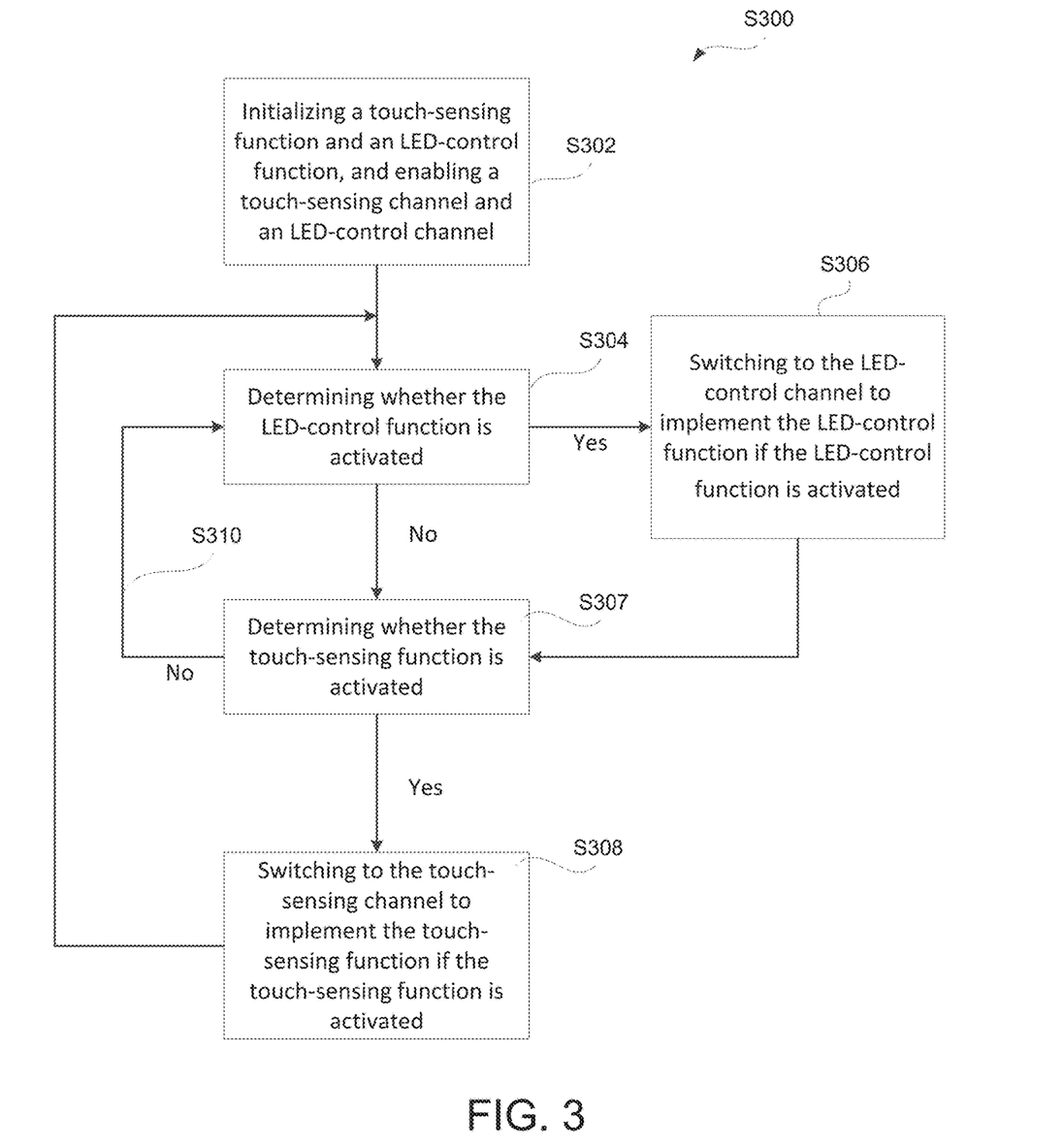
FIG. 3 is a simplified flow diagram showing a method for switching states between touch-sensing and LED-control, according to some embodiments of the present invention.

FIG. 3 is a simplified flow diagram showing a method S300 for switching states between touch-sensing and LED-control, according to some embodiments of the present invention. This diagram is merely an example, which should not unduly limit the scope of the claims. One of ordinary skill in the art would recognize many variations, alternatives, and modifications. Although the above has been shown using a selected group of processes, there can be many alternatives, modifications, and variations. For example, some of the processes may be expanded and/or combined. Other processes may be inserted to those noted above. Depending upon the embodiment, the arrangement of the processes may be interchanged with others replaced.

In various embodiments, the method S300 for switching states between touch-sensing and LED-control includes a process S302 of initializing (e.g., setting one or more terminals to floating) a touch-sensing function and an LED-control function, and enabling a touch-sensing channel and an LED-control channel, a process S304 of determining whether the LED-control function is activated, a process S306 of switching to the LED-control channel to implement the LED-control function if the LED-control function is activated, a process S307 of determining whether the touch-sensing function is activated, a process S308 of switching to the touch-sensing channel to implement the touch-sensing function if the touch-sensing function is activated, a process S310 of returning to the process of S304 if the touch-sensing function is not activated. In some examples, the process S307 of determining whether the touch-sensing function is activated is performed if the LED-control function is determined to be not activated. In certain examples, the method S300 includes returning to the process S304 after the process S308. In various examples, the process S302 is implemented using software, and the processes S304, S306, S307, S308, and S310 are implemented using hardware, such as the control system shown in FIG. 1.

Figure 4:
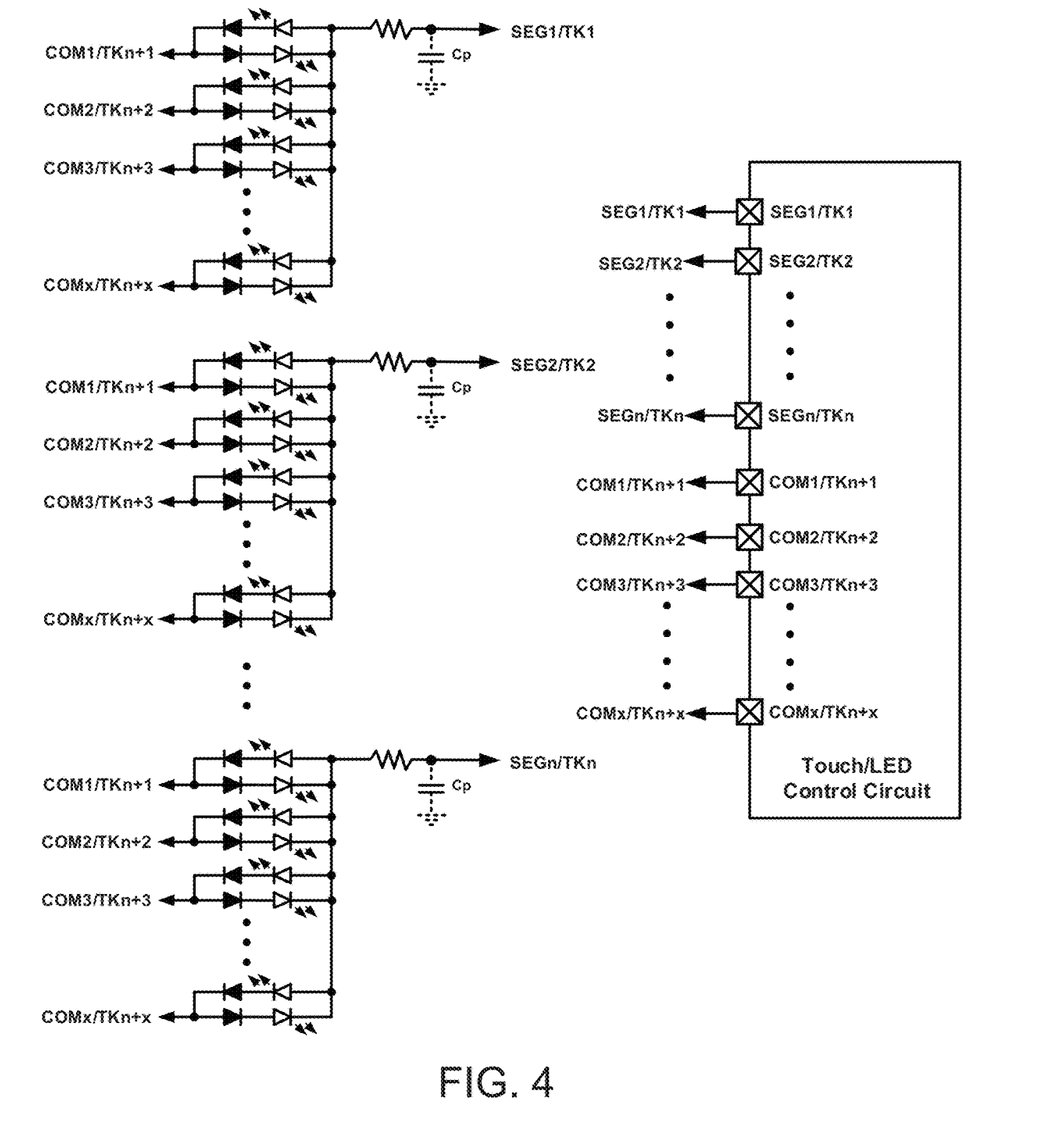
FIG. 4 is a simplified system diagram showing another control circuit for touch-sensing and LED-control, according to some embodiments of the present invention.

FIG. 4 is a simplified system diagram showing another control system for touch-sensing and LED-control, according to some embodiments of the present invention. This diagram is merely an example, which should not unduly limit the scope of the claims. One of ordinary skill in the art would recognize many variations, alternatives, and modifications. The control system includes a plurality of LEDs, a plurality of diodes, a plurality of connection points (which may be referred to as connection nodes), a plurality of current-limiting resistors, a plurality of touch-sensing capacitors, and a control chip. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

As shown in FIG. 4, in certain embodiments, the SEG1/TK1 to SEGn/TKn terminals of the control chip are forward-biasedly connected to a first LED group of the n LEDs of the control circuit. In some examples, the anodes of the first LED group of n LEDs are connected to the COM1/TKn+1 to COMx/TKn+x terminals of the control chip. In various examples, the COM1/TKn+1 to COMx/TKn+x terminals of the control chip are forward-biasedly connected to the anodes of a second LED group of the n LEDs respectively, and the cathodes of the second LED group of the n LEDs are connected to the SEG1/TK1 to SEGn/TKn terminals of the control chip respectively. In some examples, the operation of the control circuit shown in FIG. 4 is similar to the operation of the control circuit shown in FIG. 1.

In some embodiments, when compared to conventional systems where the touch-sensing function and the LED-control function are implemented by different terminals of the control chip respectively, a control circuit according to FIG. 1, FIG. 2, FIG. 3, and/or FIG. 4 using time-division multiplexing enables implementation of both the touch-sensing function and the LED-control function based on at least shared or common terminals of a control chip. In some examples, the number of LED drivable by a control circuit according to FIG. 1, FIG. 2, FIG. 3, and/or FIG. 4 can be doubled while fixing the number of terminals of the control chip.

Figure 5:
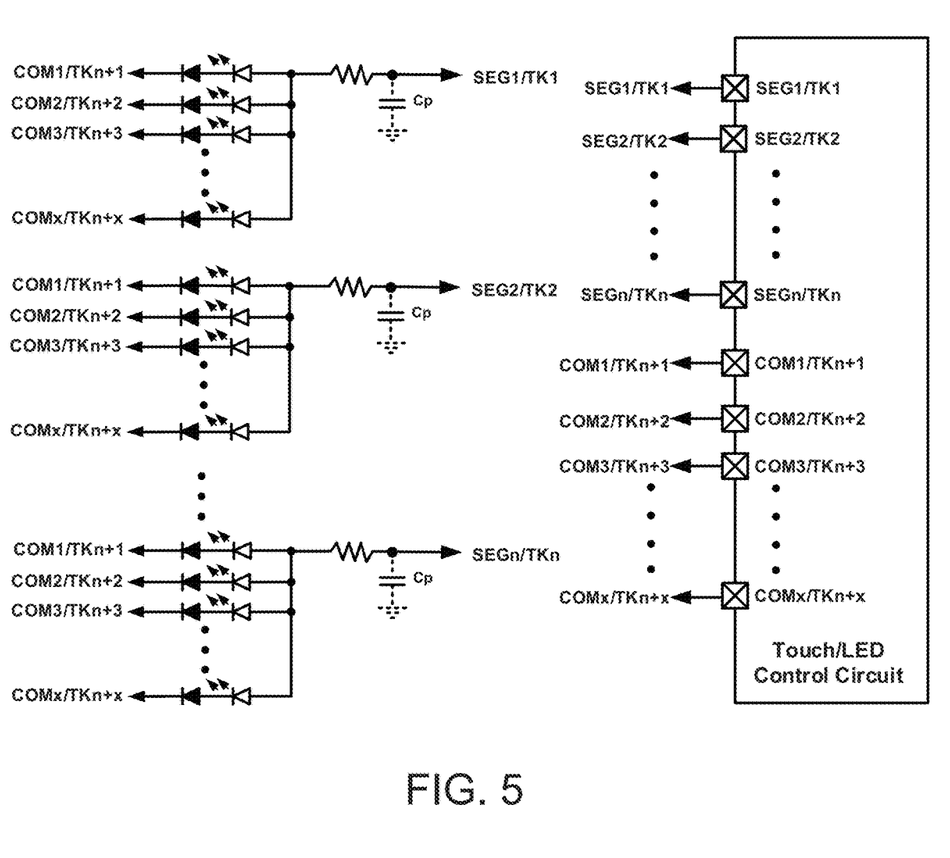
FIG. 5 is a simplified system diagram showing another control circuit for touch-sensing and LED-control, according to some embodiments of the present invention.

FIG. 5 is a simplified system diagram showing another control circuit for touch-sensing and LED-control, according to some embodiments of the present invention. This diagram is merely an example, which should not unduly limit the scope of the claims. One of ordinary skill in the art would recognize many variations, alternatives, and modifications. The control circuit includes a plurality of LEDs, a plurality of diodes, a plurality of connection points (which may be referred to as connection nodes), a plurality of current-limiting resistors, a plurality of touch-sensing capacitors, and a control chip. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

As shown in FIG. 5, in various embodiments, the SEG1/TK1 to SEGn/TKn terminals of the control chip are forward-biasedly connected to the anodes of the LEDs, and the cathodes of the LEDs are connected to the COM1/TKn+1 to COMx/TKn+x terminals of the control chip via corresponding diodes. In some examples, when the control circuit is in a LED-control mode, the COM/TK terminals (including COM1/TKn+1 to COMx/TKn+x) of the control chip are set to grounded, and their corresponding SEG/TK terminals (including SEG1/TK1 to SEGn/TKn) are set to in connection to the operating voltage VDD to illuminate the LEDs at particular timing, such as according to a specific timing preset (e.g., set via a software). In certain examples, when the control circuit is in the touch-sensing mode, scanning of each terminal of the plurality of terminals of the control chip is performed, such as according to a specific timing preset (e.g., set via a software). For example, scanning each terminal includes scanning each touch key of the plurality of touch keys. In some examples, the touch keys are part of the control circuit, in others, the touch keys are separate from the control circuit. In some examples, the operation of the control circuit shown in FIG. 5 is similar to the operation of the control circuit shown in FIG. 1.

Figure 6:
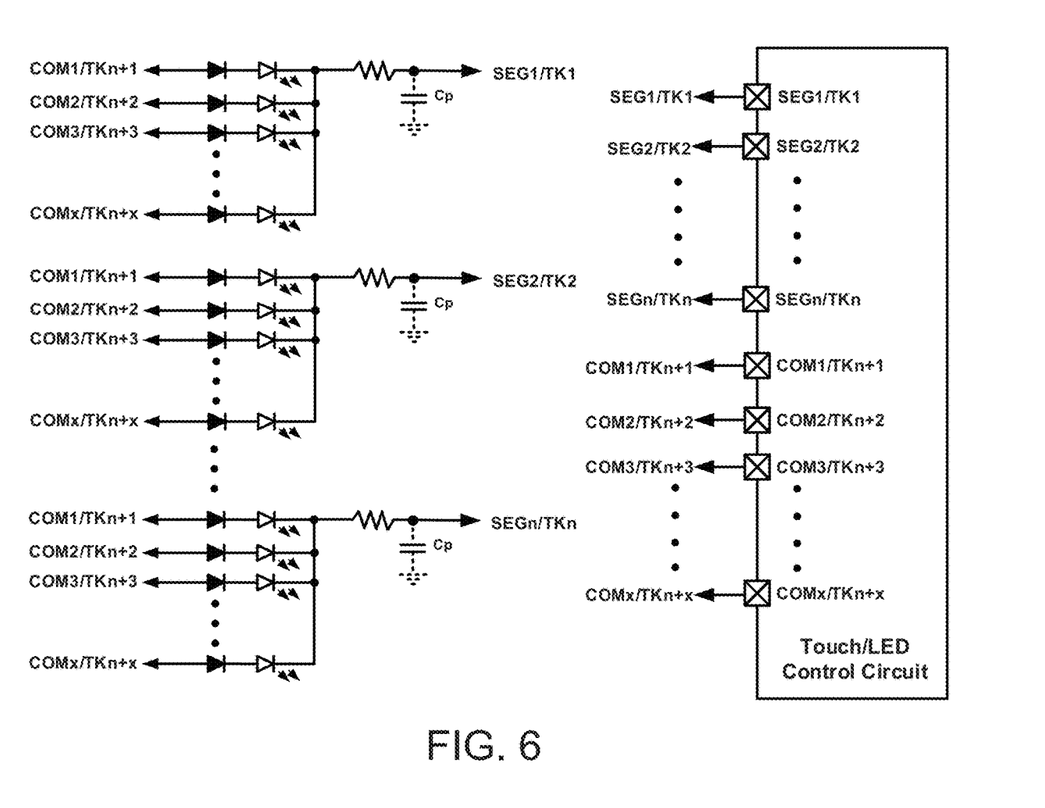
FIG. 6 is a simplified system diagram showing another control circuit for touch-sensing and LED-control, according to some embodiments of the present invention.

FIG. 6 is a simplified system diagram showing another control circuit for touch-sensing and LED-control, according to some embodiments of the present invention. This diagram is merely an example, which should not unduly limit the scope of the claims. One of ordinary skill in the art would recognize many variations, alternatives, and modifications. The control circuit includes a plurality of LEDs, a plurality of diodes, a plurality of connection points (which may be referred to as connection nodes), a plurality of current-limiting resistors, a plurality of touch-sensing capacitors, and a control chip. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

As shown in FIG. 6, in various embodiments, the SEG1/TK1 to SEGn/TKn terminals of the control chip are reward-biasedly connected to the cathodes of the LEDs, and the anodes of the LEDs are connected to the COM1/TKn+1 to COMx/TKn+x terminals of the control chip via corresponding diodes. In some examples, when the control circuit is in a LED-control mode, the COM/TK terminals (including COM1/TKn+1 to COMx/TKn+x) of the control chip are set to in connection to the operating voltage VDD, and their corresponding SEG/TK terminals (including SEG1/TK1 to SEGn/TKn) are set to in connection to grounded to illuminate the LEDs at particular timing, such as according to a specific timing preset (e.g., set via a software). In certain examples, when the control circuit is in the touch-sensing mode, scanning of each terminal of the plurality of terminals of the control chip is performed, such as according to a specific timing preset (e.g., set via a software). For example, scanning each terminal includes scanning each touch key of the plurality of touch keys. In some examples, the touch keys are part of the control circuit, in others, the touch keys are separate from the control circuit. In some examples, the operation of the control circuit shown in FIG. 6 is similar to the operation of the control circuit shown in FIG. 1.

In some embodiments, when compared to conventional systems where the touch-sensing function and the LED-control function are implemented by different terminals of the control chip respectively, a control circuit according to FIG. 5 and/or FIG. 6 using time-division multiplexing enables implementation of both the touch-sensing function and the LED-control function based on at least shared or common terminals of a control chip. In some examples, the number of LED drivable by a control circuit according to FIG. 5 and/or FIG. 6 can be doubled while fixing the number of terminals of the control chip. In various examples, the LED-control function is implemented by the terminals of the control chip, such as via software. In certain examples, the touch-sensing function and/or the LED-control function is implemented by the hardware itself, such as automatically, thus reducing use of resources. In some examples, the algorithm described in any of the described particular embodiments can be modified.

In various embodiments, a system for touch sensing and LED control for a touch screen includes: a control chip including m first multiplexing terminals and n second multiplexing terminals, wherein m and n are integers greater than 2; k LEDs, wherein a rth LED of the k LEDs is connected to an ith first multiplexing terminal of the m first multiplexing terminals and to a jth second multiplexing terminal of the n second multiplexing terminals; wherein: the rth LED is in between the ith first multiplexing terminal and the jth second multiplexing terminal; r is an integer greater than 0 and less than or equal to k; i is an integer greater than 0 and less than or equal to m; j is an integer greater than 0 and less than or equal to n; and (m+n) touch-sensing capacitors, wherein each touch-sensing capacitor of the (m+n) touch-sensing capacitors is connected to a reference ground and to one multiplexing terminal selected from the m first multiplexing terminals and the n second multiplexing terminals. In some examples, the circuit is implemented as in FIG. 1, FIG. 4, FIG. 5, and/or FIG. 6. In certain examples, the circuit is configured to implement the method S300 of FIG. 3.

In some examples, the k LEDs of the circuit are divided into m LED groups, with each LED group of the m LED groups including n LEDs. An ith LED group of the m LED groups is connected to the ith first multiplexing terminal of the m first multiplexing terminals and to each second multiplexing terminal of the n second multiplexing terminals, the ith LED group is in between the ith first multiplexing terminal and each second multiplexing terminal, and the ith first multiplexed terminal is forward-biasedly connected (e.g., positively connected) or reverse-biasedly connected (e.g., negatively connected) to the anode of each LED of the ith LED group.

In some examples, the k LEDs of the circuit are divided into m LED groups, with each LED group of the m LED groups includes 2n LEDs. An ith LED group of the m LED groups is connected to the ith first multiplexing terminal of the m first multiplexing terminals and to each second multiplexing terminal of the n second multiplexing terminals, the ith LED group is in between the ith first multiplexing terminal and each second multiplexing terminal, the ith first multiplexed terminal is forward-biasedly connected to the anode of one LED of the 2n LEDs of the ith LED group and reverse-biasedly connected to the cathodes of the remaining LEDs of the 2n LEDs of the ith LED group.

In some examples, the system further includes k diodes serially connected to the k LEDs, wherein each diode of the k diodes is serially connected with at least one LED of the k LEDs.

In some examples, the system further includes m current-limiting resistors connected to the m first multiplexing terminals and to the k LEDs, wherein each of the m current-limiting resistors is connected between one of the m first multiplexing terminals and at least one LED of the k LEDs.

In some examples, the m first multiplexing terminals and the n second multiplexing terminals of the circuit are configured to implement a touch-sensing function and a LED-control function based on at least time-division multiplexing.

In various embodiments, a control chip for touch sensing and LED control for a touch screen includes: m first multiplexing terminals, m being an integer greater than 2; and n second multiplexing terminals, n being an integer greater than 2; wherein: an ith first multiplexing terminal of the m first multiplexing terminals and a jth second multiplexing terminal of the n second multiplexing terminals are configured to connect with a rth LED of k LEDs, r is an integer greater than 0 and less than or equal to k, i is an integer greater than 0 and less than or equal to m, j is an integer greater than 0 and less than or equal to n; and one multiplexing terminal selected from the m first multiplexing terminals and the n second multiplexing terminals is configured to connect with each teach-sensing capacitor of (m+n) touch-sensing capacitors. In some examples, the control chip is implemented as part of a control circuit, such as the control circuit of FIG. 1, FIG. 4, FIG. 5, and/or FIG. 6. In certain examples, the control chip is configured to implement the method S300 of FIG. 3.

In some examples, the ith first multiplexing terminal of the m first multiplexing terminals and each second multiplexing terminal of the n second multiplexing terminals are configured to connect with an ith LED group of m LED groups, the ith first multiplexed terminal is configured to forward-biasedly or reverse-biasedly connect with the anode of each LED of the ith LED group.

In some examples, the ith first multiplexing terminal of the m first multiplexing terminals and each second multiplexing terminal of the n second multiplexing terminals are configured to connect with an ith LED group of the m LED groups, the ith first multiplexed terminal is configured to forward-biasedly connect with the anode of one LED of the 2n LEDs of the ith LED group and to reverse-biasedly connect with the cathodes of the remaining LEDs of the 2n LEDs of the ith LED group.

In some examples, the m first multiplexing terminals are configured to connect with m current-limiting resistors, each of the m first multiplexing terminals is configured to connect with one of the m current-limiting resistors.

In some examples, the m first multiplexing terminals and the n second multiplexing terminals are configured to implement a touch-sensing function and a LED-control function based on at least time-division multiplexing.

In various embodiments, the method for switching states between touch-sensing and LED-control for a touch-screen using a control chip includes: initializing a touch-sensing function and an LED-control function; enabling a touch-sensing channel and an LED-control channel; determining whether the LED-control function is activated; if the LED-control function is activated, switching to the LED-control channel to implement the LED-control function; determining whether the touch-sensing function is activated; and if the touch-sensing function is activated, switching to the touch-sensing channel to implement the touch-sensing function. In some examples, the method is implemented according to the method S300 of FIG. 3 and/or is implemented by the control circuit (or by the control chip of the control circuit) of FIG. 1, FIG. 4, FIG. 5, and/or FIG. 6.

In some examples, after switching to the touch-sensing channel to implement the touch-sensing function, determining whether the LED-control function is activated.

In some examples, after switching to the LED-control channel to implement the LED-control function, determining whether the touch-sensing function is activated.

In some examples, the determining whether the touch-sensing function is activated includes: if the LED-control function is determined to be not activated, determining whether the touch-sensing function is activated.

In some examples, the determining whether the LED-control function is activated includes: if the touch-sensing function is determined to be not activated, determining whether the LED-control function is activated.

In some examples, the determining whether the LED-control function is activated includes repeating at least: determining whether the LED-control function is activated; if the LED-control function is activated, switching to the LED-control channel to implement the LED-control function; determining whether the touch-sensing function is activated; and if the touch-sensing function is activated, switching to the touch-sensing channel to implement the touch-sensing function.

In some examples, the initializing a touch-sensing function and an LED-control function includes setting one or more multiplexing terminals of the control chip to floating.

In some examples, the method for switching states between touch-sensing and LED-control for a touch-screen using a control chip further includes receiving a touch-sensing signal from a touch-sensing capacitor connected to a multiplexing terminal of the control chip via the touch-sensing channel.

In some examples, enabling the LED-control channel includes forming a LED-loop from a first multiplexing terminal of the control chip through a LED and to a second multiplexing terminal of the control chip.

In certain embodiments, the circuit for touch-sensing and LED-control for a capacitive touch screen implements a touch-sensing function and a LED-control function based on at least controlling the same one or more terminals of a control chip, which in some examples, enables driving of a large number of LEDs.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A system for touch sensing and LED control for a touch screen, the circuit comprising:
    a control chip including m first multiplexing terminals and n second multiplexing terminals, wherein m and n are integers greater than 2; and
    k LEDs, wherein a rth LED of the k LEDs includes a first terminal and a second terminal, wherein the first terminal of the rth LED is coupled to an ith first multiplexing terminal of the m first multiplexing terminals, wherein the second terminal of the rth LED is coupled to a jth second multiplexing terminal of the n second multiplexing terminals;
    wherein:
        r is an integer greater than 0 and less than or equal to k;
        i is an integer greater than 0 and less than or equal to m;
        j is an integer greater than 0 and less than or equal to n; and
        (m+n) touch-sensing capacitors, wherein each touch-sensing capacitor of the (m+n) touch-sensing capacitors is connected between a reference ground and one multiplexing terminal selected from the m first multiplexing terminals and the n second multiplexing terminals.

2. The system of claim 1, wherein the k LEDs are divided into m LED groups, each LED group of the m LED groups includes n LEDs, an ith LED group of the m LED groups is connected between the ith first multiplexing terminal of the m first multiplexing terminals and each second multiplexing terminal of the n second multiplexing terminals, the ith first multiplexed terminal is forward-biasedly or reverse-biasedly connected to the anode of each LED of the ith LED group.

3. The system of claim 1, wherein the k LEDs are divided into m LED groups, each LED group of the m LED groups includes 2n LEDs, an ith LED group of the m LED groups is connected between the ith first multiplexing terminal of the m first multiplexing terminals and each second multiplexing terminal of the n second multiplexing terminals, the ith first multiplexed terminal is forward-biasedly connected to the anode of one LED of the 2n LEDs of the ith LED group and reverse-biasedly connected to the cathodes of the remaining LEDs of the 2n LEDs of the ith LED group.

4. The system of claim 1, further including k diodes serially connected to the k LEDs, wherein each diode of the k diodes is serially connected with at least one LED of the k LEDs.

5. The system of claim 1, further including m current-limiting resistors connected to the m first multiplexing terminals and to the k LEDs, wherein each of the m current-limiting resistors is connected between one of the m first multiplexing terminals and at least one LED of the k LEDs.

6. The system of claim 1, wherein the m first multiplexing terminals and the n second multiplexing terminals are configured to implement a touch-sensing function and a LED-control function based on at least time-division multiplexing.

7. A control chip for touch sensing and LED control for a touch screen, the control chip comprising:
   m first multiplexing terminals, m being an integer greater than 2; and
   n second multiplexing terminals, n being an integer greater than 2;
   wherein:
      an ith first multiplexing terminal of the m first multiplexing terminals is coupled to a first terminal of a rth LED of k LEDs, a jth second multiplexing terminal of the n second multiplexing terminals is coupled to a second terminal of the rth LED of the k LEDs, the first terminal of the rth LED is different from the second terminal of the rth LED, r is an integer greater than 0 and less than or equal to k, i is an integer greater than 0 and less than or equal to m, and j is an integer greater than 0 and less than or equal to n; and
      one multiplexing terminal selected from the m first multiplexing terminals and the n second multiplexing terminals is configured to connect with each touch sensing capacitor of (m+n) touch-sensing capacitors.

8. The control chip of claim 7, wherein the ith first multiplexing terminal of the m first multiplexing terminals and each second multiplexing terminal of the n second multiplexing terminals are configured to connect with an ith LED group of m LED groups, the ith first multiplexed terminal is configured to forward-biasedly or reverse-biasedly connect with the anode of each LED of the ith LED group.

9. The control chip of claim 7, wherein the ith first multiplexing terminal of the m first multiplexing terminals and each second multiplexing terminal of the n second multiplexing terminals are configured to connect with an ith LED group of the m LED groups, the ith first multiplexed terminal is configured to forward-biasedly connect with the anode of one LED of the 2n LEDs of the ith LED group and to reverse-biasedly connect with the cathodes of the remaining LEDs of the 2n LEDs of the ith LED group.

10. The control chip of claim 7, wherein the m first multiplexing terminals are configured to connect with m current-limiting resistors, each of the m first multiplexing terminals is configured to connect with one of the m current-limiting resistors.

11. The control chip of claim 7, wherein the m first multiplexing terminals and the n second multiplexing terminals are configured to implement a touch-sensing function and a LED-control function based on at least time-division multiplexing.

12. A method for switching states between touch-sensing and LED-control for a touch-screen using a control chip, the method comprising:
   initializing a touch-sensing function and an LED-control function;
   enabling a touch-sensing channel and an LED-control channel;
   determining whether the LED-control function is activated;
   if the LED-control function is activated, switching to the LED-control channel to implement the LED-control function, wherein the control chip includes a plurality of first multiplexing terminals and a plurality of second multiplexing terminals, wherein the LED control channel includes a first terminal of each LED of k LEDs coupled to a terminal of the plurality of the first multiplexing terminals and a second terminal of the each LED of the k LEDs coupled to a terminal of the plurality of the second multiplexing terminals;
   determining whether the touch-sensing function is activated; and
   if the touch-sensing function is activated, switching to the touch-sensing channel to implement the touch-sensing function.

13. The method of claim 12, further including:
   after switching to the touch-sensing channel to implement the touch-sensing function, determining whether the LED-control function is activated.

14. The method of claim 12, further including:
   after switching to the LED-control channel to implement the LED-control function, determining whether the touch-sensing function is activated.

15. The method of claim 12 wherein the determining whether the touch-sensing function is activated includes:
   if the LED-control function is determined to be not activated, determining whether the touch-sensing function is activated.

16. The method of claim 12 wherein the determining whether the LED-control function is activated includes:
   if the touch-sensing function is determined to be not activated, determining whether the LED-control function is activated.

17. The method of claim 12 wherein the determining whether the LED-control function is activated includes repeating at least:
   determining whether the LED-control function is activated;
   if the LED-control function is activated, switching to the LED-control channel to implement the LED-control function;
   determining whether the touch-sensing function is activated; and
   if the touch-sensing function is activated, switching to the touch-sensing channel to implement the touch-sensing function.

18. The method of claim 12, wherein the initializing a touch-sensing function and an LED-control function includes setting one or more multiplexing terminals of the control chip to floating.

19. The method of claim 12, further includes receiving a touch-sensing signal from a touch-sensing capacitor connected to a multiplexing terminal of the control chip via the touch-sensing channel.

20. The method of claim 12, wherein enabling the LED-control channel includes forming a LED-loop from a first multiplexing terminal of the control chip through a LED and to a second multiplexing terminal of the control chip.

\* \* \* \* \*